United States Patent [19]

Kurdzo et al.

[11] Patent Number: 5,469,434
[45] Date of Patent: Nov. 21, 1995

[54] DISTRIBUTED FRAME PROCESSING FOR TIME DIVISION MULTIPLEXING

[75] Inventors: James P. Kurdzo, Watertown; Alan B. Katze, Jr., Naugatuck, both of Conn.

[73] Assignee: General DataComm, Inc., Middlebury, Conn.

[21] Appl. No.: 7,074

[22] Filed: Jan. 21, 1993

[51] Int. Cl.$^6$ .......................................... H04J 3/02
[52] U.S. Cl. .............................. 370/67; 370/84; 370/85.9; 370/85.7
[58] Field of Search ........................... 370/112, 58.1, 370/58.2, 95.1, 95.2, 85.1, 11, 85.7, 85.8 A, 84, 67; 340/825.5, 825.07, 825.08

[56] References Cited

U.S. PATENT DOCUMENTS

| | | | |
|---|---|---|---|
| 4,653,049 | 3/1987 | Shinmyo | 370/95.3 |
| 4,742,512 | 5/1988 | Akashi et al. | 370/95.3 |
| 4,763,320 | 8/1988 | Rudolph et al. | 370/85.7 |
| 4,787,081 | 11/1988 | Waters et al. | 370/84 |
| 4,872,003 | 10/1989 | Yoshida | 370/85.8 |
| 4,881,224 | 9/1989 | Bains | 370/84 |
| 4,882,730 | 11/1989 | Shinmyo | 370/95.2 |
| 4,907,222 | 3/1990 | Slarik | 370/85.7 |
| 5,084,872 | 1/1992 | Le Cucq et al. | 370/85.1 |
| 5,144,621 | 9/1992 | Kinashi et al. | 370/85.1 |
| 5,177,737 | 1/1993 | Daudelin et al. | 370/85.7 |

OTHER PUBLICATIONS

Stallings, Data And Computer Communications, 1988, pp. 42–45, 174–175, and 182–185.

Primary Examiner—Douglas W. Olms
Assistant Examiner—Chau T. Nguyen
Attorney, Agent, or Firm—David P. Gordon

[57] ABSTRACT

A time division multiplexer (TDM) is provided for multiplexing data from a plurality of channels. The TDM system generally comprises a high speed time division multiplexed digital data bus, a synchronizing bus, a plurality of channel cards coupled between the data channels and the data bus with each channel card having its own processor and memory, and a system communication manager (SCM) which is also coupled to the digital bus, and includes a (micro)processor. The processor of the SCM determines the frame for the system and initially forwards the frame information to each of the channel cards during predetermined time slots of the high speed data bus. The channel cards are synchronized by the SCM via the synchronization bus, and the channel cards use the synchronization information and the framing information in order to appropriately place data on and take data off of the high speed data bus without the use of an address bus. A system overhead frame (SOF) is also preferably multiplexed into timeslots of the high speed data bus. Thus, during operation, the high speed data bus multiplexes not only data from the channel cards, but system overhead information as well as framing information.

20 Claims, 8 Drawing Sheets

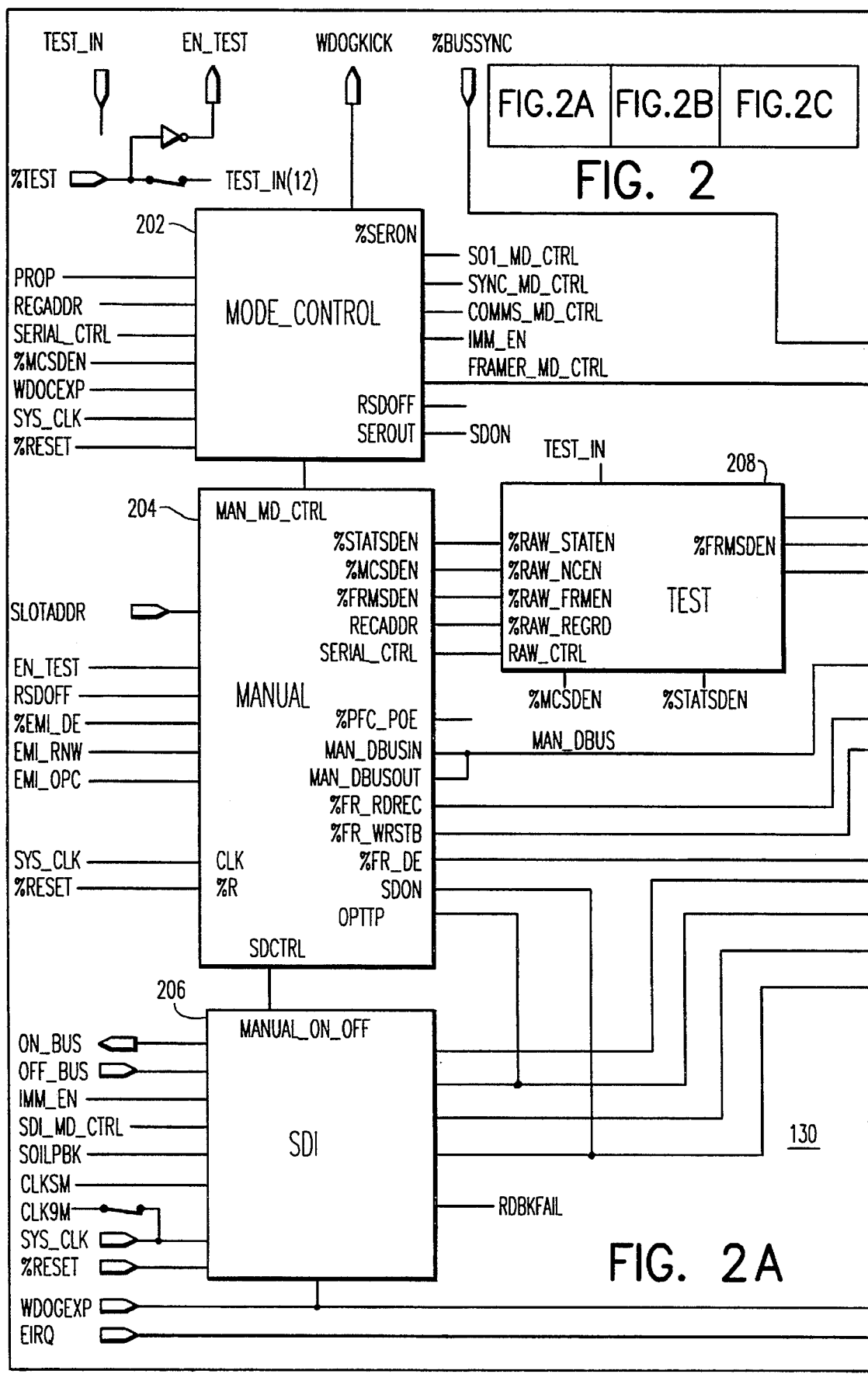

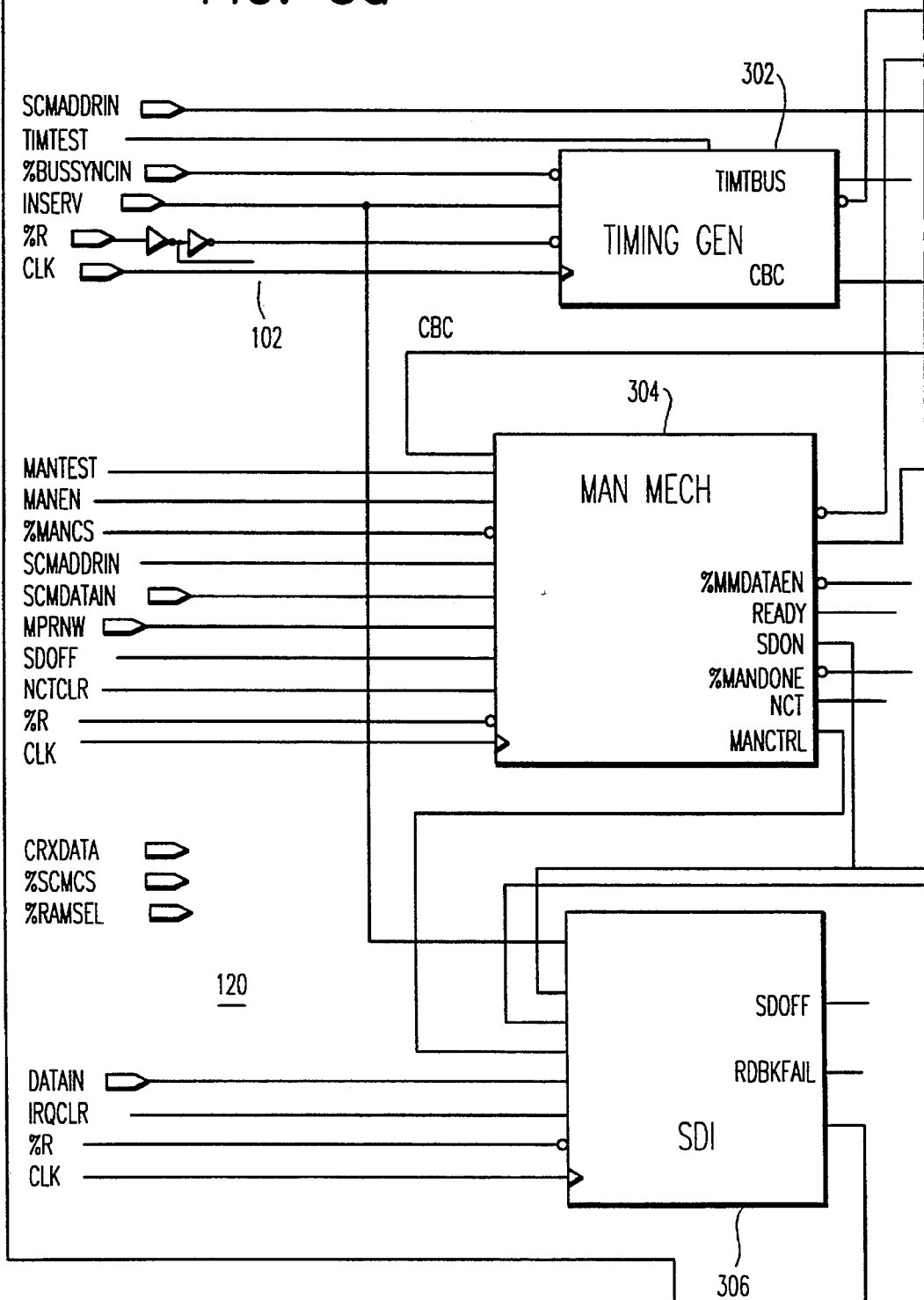

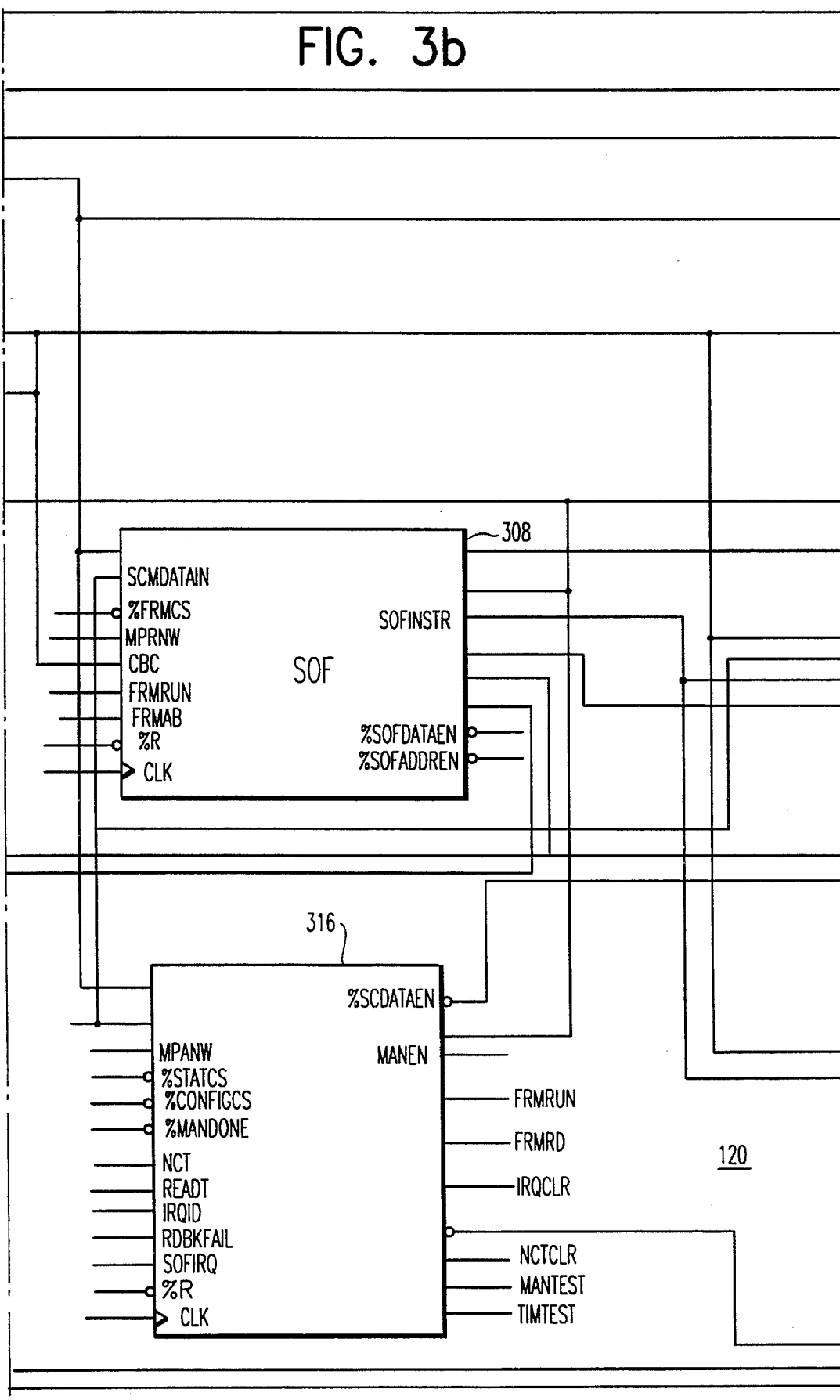

DISTRIBUTED FRAME PROCESSING FOR TIME DIVISION MULTIPLEXING

BACKGROUND OF THE INVENTION

1. Field of the Invention

This invention relates generally to telecommunications systems. More particularly, the present invention relates to time-division-multiplexers (TDMs).

2. State of the Art

Known TDM systems are used for multiplexing information present on a plurality of input channels onto a single output or aggregate data channel. This multiplexing function is generally achieved by the use of a data "frame" to efficiently allocate and combine the incoming data from the input channels into the aggregate channel. An example of a framing algorithm for allocating the data from a plurality of input channels to an aggregate channel is disclosed in U.S. Pat. No. 4,881,224 to Bains, which is hereby incorporated herein by reference in its entirety.

In typical TDM systems of the art, a central processor and a plurality of channel modules are provided. The incoming channels are coupled to the individual channel modules. Each channel module is typically coupled to the central processor via a data bus and an address bus. The central processor generates and contains the framing algorithm. The central processor executes the framing algorithm by communicating with the channel modules. In particular, based on the framing algorithm, the central processor uses the address bus to inform the channel modules as to the particular times they are to place information on a data bus. Thus, the central processor places an address on the address bus, and the channel module at that address is then permitted to place information on the data bus. In bit interleaved multiplexers, the information placed by the channel module onto the data bus is a single bit of information at a time. It will be appreciated that in byte interleaved multiplexers, when the address of the channel module is indicated, a whole byte of information may be placed onto the data bus.

With the prior art systems, large burdens are placed on the central processor. Not only does the central processor have to supervise the time division multiplexing of data onto the data bus by quickly generating and sending source and destination addresses to the channel modules via the address bus according to the determined framing algorithm, but the central processor typically is utilized to check the status of the various channel modules and to test that they are functioning properly. While at relatively slow speeds these functions may be readily accomplished, at high TDM rates, difficulties arise.

SUMMARY OF THE INVENTION

It is therefore an object of the invention to provide a system for time division multiplexing where the processing necessary for implementing a data frame is distributed among a plurality of modules.

It is also an object of the invention to provide a system for multiplexing data from a plurality of channel modules onto a high speed bit serial data bus without the use of a separate address bus.

It is another object of the invention to provide a time division multiplexing system, where the system overhead uses the same data bus which carries the data.

It is a further object of the invention to provide a TDM systems where a plurality of channel modules are provided with a data storage mechanism for storing a data frame, and wherein the channel modules synchronously and simultaneously run the data frame in order to determine when to place data onto a data bus.

Another object of the invention is to provide a time division multiplexing system where the framing algorithm for the system is communicated by a central processor to each of the channel modules over the time division multiplexed data bus which carries data.

In accord with these objects which will be discussed in detail below, a TDM system is provided for multiplexing data from a plurality of channels. The TDM system generally comprises a high speed time division multiplexed digital data bus, a plurality of channel cards coupled between the data channels and the data bus with each channel card having its own processor and memory, and a system communication manager which is also coupled to the digital bus, and includes a microprocessor. The processor of the common control module determines the frame for the system and initially forwards the frame information to each of the channel cards during predetermined time slots of the high speed time division multiplexed digital data bus. The channel cards are synchronized by the communication manager via a synchronization bus, and the channel cards use the synchronization information and the framing information in order to appropriately place data on and take data off of the high speed data bus without ever being addressed by an address bus. More particularly, where the data frame comprises a sequence of bits relating to the channels from which data is to be placed on or taken off the bus, each of the plurality of channel card processors synchronously runs the data frame thereby placing data onto and taking data off of the digital bus according to the data frame when the channel with which a particular processor is associated is indicated by the data frame. Because predetermined time slots of the high speed TDM bus are required during initialization in order to send the framing information to the channel cards, the same time slots may also used while the system is running (i.e., multiplexing data) in order to reconfigure the frame of the system "on the fly". In addition, in accord with a preferred aspect of the invention, a system overhead frame is also multiplexed into timeslots of the high speed data bus. Thus, during operation, the high speed data bus multiplexes not only data from the channel cards, but system overhead information as well as framing information.

Additional objects and advantages of the invention will become apparent to those skilled in the art upon reference to the detailed description taken in conjunction with the provided figures.

BRIEF DESCRIPTION OF THE DRAWINGS

FIG. 3 and 3A–3C are a block diagram showing a preferred system communication manager (SCM) utilized in the common control module of the invention.

DETAILED DESCRIPTION OF THE PREFERRED EMBODIMENT

Figure 1:
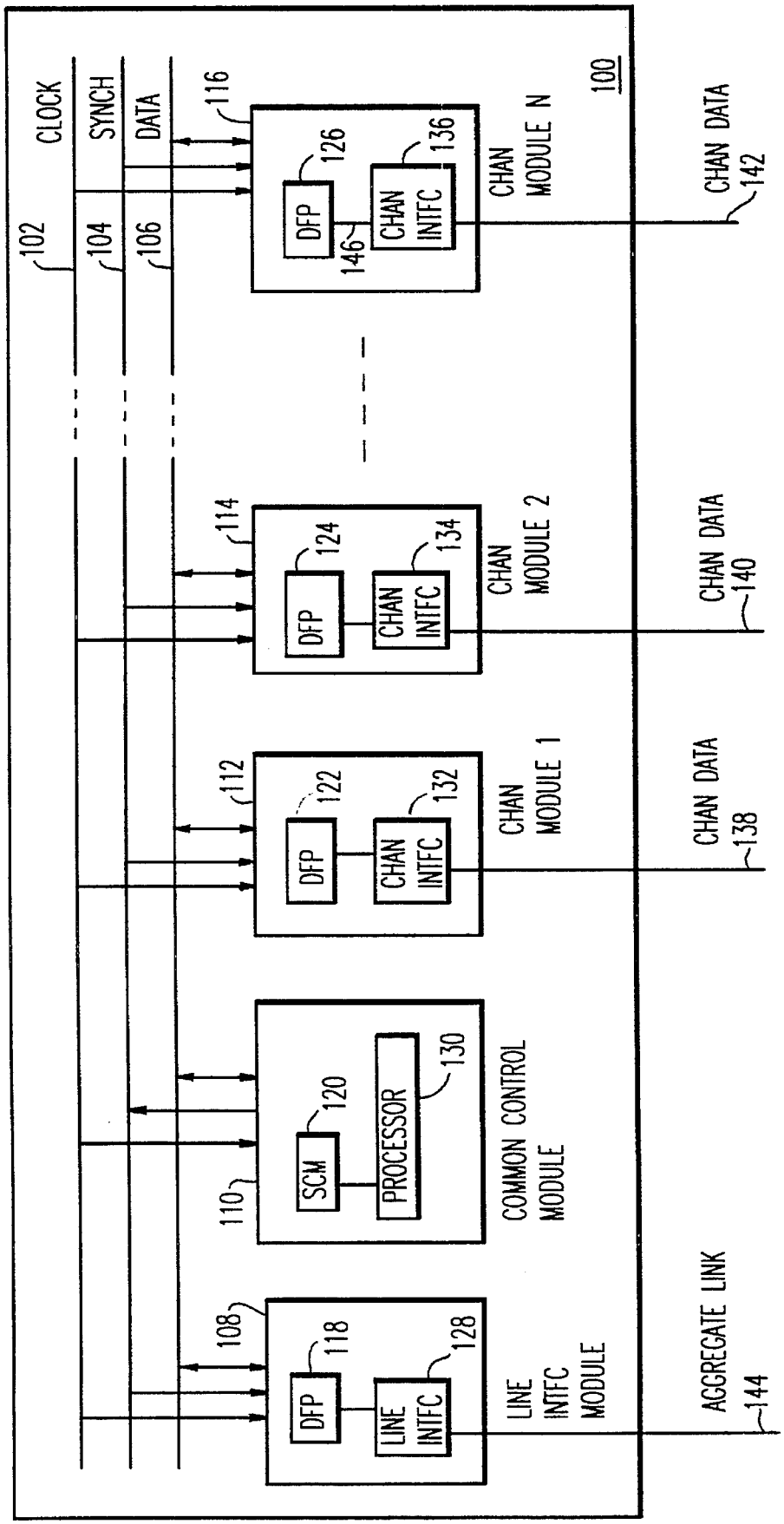
FIG. 1 is a block diagram showing the interconnection of the major components of a time division multiplex (TDM) system of the invention.

The preferred TDM structure for the present invention is shown in FIG. 1. Here, TDM system 100 includes a system clock bus 102, a system synchronization bus 104, a high speed bit serial data bus 106, a line interface module 108, a common control module 110, and a plurality of channel modules 112, 114, . . . 116. Each of the modules 108, 110, 112, 114 . . . , 116 are coupled to the clock, synch, and data buses, with the common control module 110 generating the synch signal 104 from the clock signal 102, and providing the synch signal to the other modules. The high speed bit serial data bus 106 is preferably implemented using wire-ORed FUTUREBUS tranceivers.

As seen in FIG. 1, each of the line interface and channel modules generally comprises a distributed frame processor (DFP) 118, 120, 122, 124, . . . 126, (which is discussed hereinafter in detail with reference to FIG. 2) and an interface 128, 130, 132, 134, . . . 136. Of course, the line interface module uses the line interface 128 to interface with an aggregate link 144, while the channel modules utilize the channel interfaces 132, 134, . . . 136 to interface to data channels 138, 140, . . . 142. Effectively, as shown, the TDM system 110 combines a number of input signals, exemplified by channel data signals 138, 140 and 142, into an output aggregate signal 144, and vice versa. Within the TDM 100, one of the paths of the signals is through channel modules 112, 114, and 116 respectively, onto high speed data bus 106, and out via the line interface module 108. The other path is through line interface module 108, onto the high speed data bus 106, and out via the channel modules 112, 114, . . . 116.

Traffic on the data bus 106 which governs the transfer of data is controlled by frame information which is determined by the common control module 110. The frame information, relating when each of modules 112, 114 and 116 are to place their data onto data bus 106 is computed, and initially stored, within module 110. It is subsequently distributed to all of the channel and line interface modules 108, 112, 114 . . . 116 within TDM 100. The frame information within common control module 110 specifies each specific time slice during the frame when each source of bus data, such as channel modules 112, 114, 116 or line interface module 108 can either read or write from/to data bus 106. For example, for a 9.216 MHz bus, 9,216,000 bits per second may be written onto the data bus and read off the data bus, and thus the frame will control 9,216,000 time slices per second. As will be discussed in more detail hereinafter, in the preferred embodiment, 512 KHz of the 9.216 MHz is used for a "manual mechanism" which relates to transmitting the frame, and an additional 512 KHz of the 9.216 MHz is used for the system overhead frame (SOF). The 8.192 MHz remainder of the 9.216 MHz is used for the channel data. For the preferred bidirectional system, the 8.192 MHz remainder permits a 4.096 MHz bandwidth in each direction; i.e., 4,096,000 bits per second can be received by the channel cards from the data channels, multiplexed on the high speed bus, and output on a plurality of aggregate links, while an additional 4,096,000 bits per second can be received by typically a plurality of line interface modules from a plurality of aggregate links, and output via the channel modules (i.e., demultiplexed) to the data channels.

As aforementioned, the frame which controls the placing of data onto and the taking of data off of the high speed data bus 106 is determined by the common control module 110. However, instead of the common control module 110 signalling each channel module via an address bus to put data onto the bus and take data off of the bus, the channel modules are capable of making those decisions independently. In particular, the on-bus and off-bus frames of the TDM system are distributed by the system control module 120 to the distributed frame processors (DFPs) 118, 122, 124, . . . 126 of the channel and line interface modules where the frames are stored and used to control access to bus 106 independently of the control module 110. The distribution of the frames to the DFPs is accomplished via the placement of frame information onto the data bus 106. In an initialization or "manual" mode, the frame data is the only data placed on the data bus, and is placed on the bus at a rate of 512 KHz in predetermined "locations" of the 9.216 MHz signal. However, as will be described hereinafter in more detail, the same locations of the 9.216 MHz signal are also reserved for framing information even when channel data (up to 8.192 MHz) is being multiplexed on the fast data bus 106.

The frames which are transmitted to the DFPs by the SCM are received and decoded (if necessary) by the distributed frame processors (DFP) 118, 122, 124 . . . , 126 in modules 108, 112, 114, and 116 respectively. The frames are then stored in RAM associated with each of the DFPs. Having received the frame information, and based on the synch signals received on bus 104, the DFP's 122, 124 . . . 126 output the data received via the channel interfaces 132, 134 and 136 on the bus 106 at times specified by the on-bus frame structure without further intervention from the common control module 110. It will be appreciated that the fast clock 102 which is distributed to all the DFP's as well as the SCM 120 provides mechanism for assuring that all DFP's in the system have a common time frame for placing data onto the bus (e.g., immediately following the rising edge of the clock). In addition, the synch bus 104 provides a synchronization signal which permits all of the modules such as modules 108, 110, 112, 114, . . . 116 to initiate an event (e.g., the start of a frame) concurrently.

In the preferred embodiment, the bus 106 is configured as a single conductor which interconnects each printed circuit board of the TDM 100 such as, for example, channel modules 112, 114 . . . 116, line interface module 108, and common control module 110. The two separate data frames (e.g., the "onto bus" data frame, and the "off of bus" data frame) are each run at the channel data rate of the fast bus (8.192 MHz) and are multiplexed by interleaving them; i.e., they are offset by a full period of the 9.216 MHz fast bus. In the preferred embodiment, each channel module or line interface card of the system (as well as the common control module) receives all data which is placed on the bus. However, in order to limit the amount of processing by each card, the modules only process the data when the receive (off-bus) frame processed by the card indicates that the data is intended for that particular card. Because the bus is bidirectional, the channel module cards could be arranged to look at information at only half the 8.192 data rate, with the line interface card and common control card looking at the other half of the data. Also, if desired, and as described in more detail hereinafter, the system can be arranged so that each card is assigned to a particular aggregate, such that, e.g., only one-half of that half of the bits on the bus could possibly be intended for any particular card. As described below, this allows each card to synchronize to one of two possible incoming (and outgoing) frames under software control. In this manner, the card would use a lower rate frame (e.g., 2.048 MHz) to determine whether the channel data on the bus is intended for it. It will be appreciated, however, that at the same time, separate mechanisms are used by the card to determine whether to put or take manual mechanism or system overhead bits onto or off of the fast bus, as described in more detail below.

Besides running the frame(s) for the module, the DFPs serve to interface the data coming from bus 106 onto the channel interface units 132, 134, . . . 136 or line interface unit 128 or vice versa. In this role, for example, DFP 118 in module 108 interfaces with line interface unit 128. The function of DFP 118 is to process the data to or from bus 106 and prepare it for processing by the line interface unit 128. Line interface unit 128, in turn, processes the data for transmission onto or off of aggregate link 144. Similarly, DFPs 122, 124, and 126 work with channel interfaces 132, 134 and 136 respectively, which are associated with channels 138, 140 and 142. A local "busy bus" 146 is provided for each module to connect the channel interface (e.g., 136) to its associated DFP (e.g. 126).

Figure 2B:
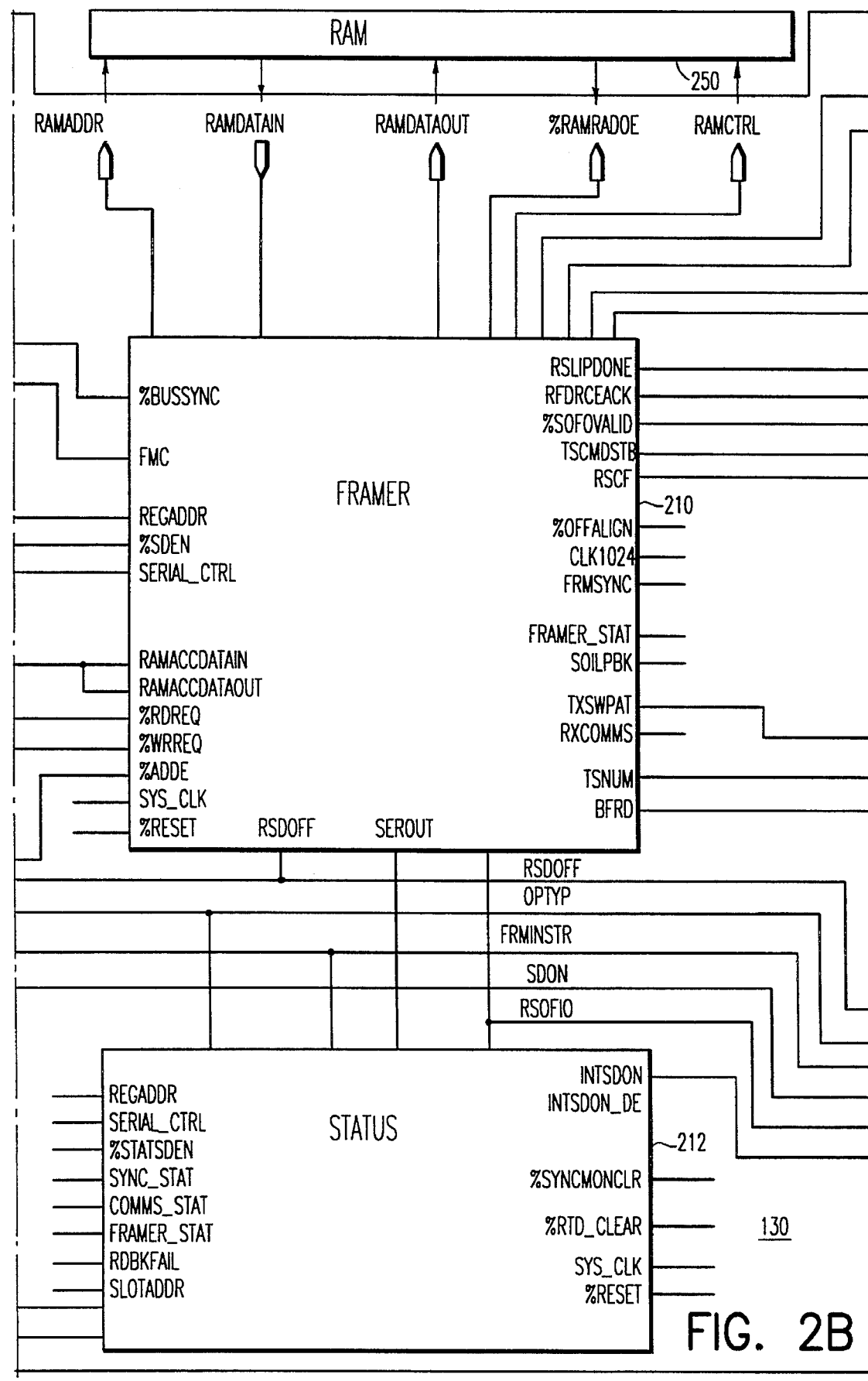
FIG. 2 (represented as FIGS. 2A, 2B and 2C, on three separate sheets) is a block diagram showing a preferred distributed frame processor (DFP) utilized in the channel cards of the invention.
Figure 2C:
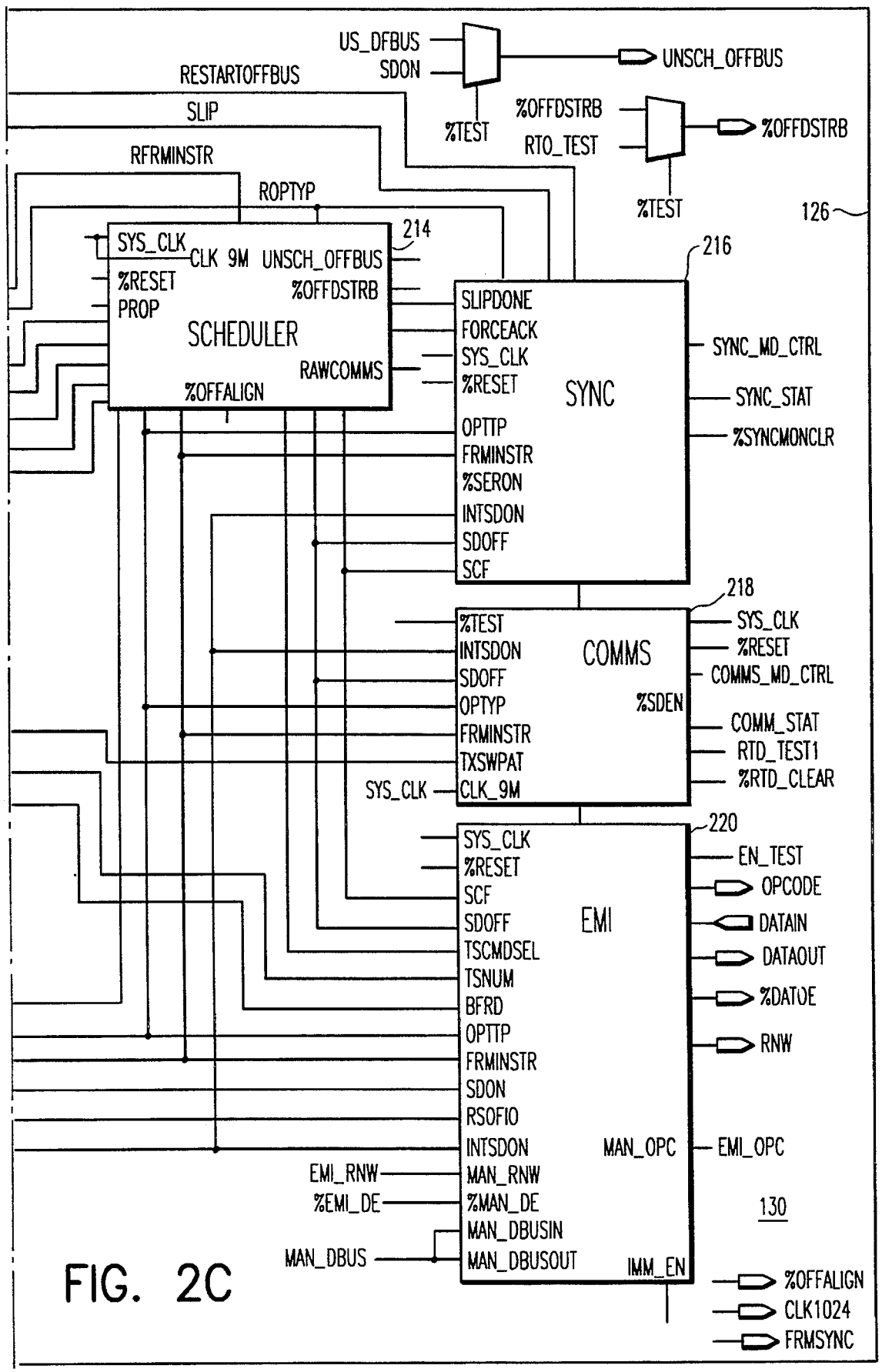

Having discussed the overall system structure, and outlined the major functions performed therein, the key subparts will now be described in greater detail. As shown in FIG. 2, an exemplary DFP 122 (the other DFPs being the same) of the present invention may be broken down into several functions or subparts such as a mode control 202, a manual mechanism 204, a serial data interface 206, a test unit 208, a framer 210, a status unit 212, a scheduler 214, a synch unit 216, a communications (COMMS) unit 218, and an external module interface (EMI) 220.

The mode control block 202 stores the operating mode, configuration and control of DFP 200. The mode control block contains registers which are written and read by the SCM 120 of the common control module 110 in order to control the operating mode and configuration of the DFP 200. For example, the mode control block 202 includes registers for setting frame pointers, setting the group number of the DFP, setting the soft address of the DFP, setting bit type, turning frames on or off, setting the synch mode, and setting the test registers of the DFP.

The manual mechanism 204 implements a hardware protocol with the SCM 120 to transfer sixteen bit words between the processor 130 of the SCM and the DFP of the channel module. In the preferred embodiment, the manual mechanism is assigned a bandwidth of 512 KHz such that one bit in eighteen transmitted on data bus 106 is used for this data transfer. The transfer protocol consists of forty bit fixed length packets which includes sixteen bits of data and twenty-four bits of address information. Because of the twenty-four bits of address information is provided in the manual mechanism coding scheme, access to any and all DFP's in a system may be accessed with a single command. It will be appreciated that each module obtains its address based on its physical location along the backplane. It will also be appreciated that the "manual mechanism" is the mechanism utilized in providing frame information to the DFPs during initialization of the system. Additional details of the manual mechanism will be described below with reference to a description of the SCM 120 and FIG. 3.

The serial data interface 206 provides an interface between the high speed data bus 106 and the internals of the DFP. The functions performed in interface 206 are timing alignment, data readback and data loopback. Data readback compares data written to and read from the bus for test purposes while data loopback aids in fault diagnosis at the field replaceable unit level.

The test unit 208 of the DFP allows the DFP to be operated in a test mode. In particular, the test block redefines several I/O pins of the DFP to allow quick access to its internal registers. The test unit is used during production test only and is not intended for use during normal operation of the device.

The framer 210 reads frame instructions from an external Frame RAM 250, and if necessary decodes those instructions. The framer 210 also executes the instructions contained in the system overhead frame (SOF) as will be discussed in more detail hereinafter with respect to FIG. 4. As with the manual mechanism, in the preferred embodiment a bandwidth of 512 KHz (one in eighteen bits of the fast data bus) is provided for the system overhead frame.

The framer 210 maintains the necessary pointers to execute multi-tiered frames as described in previously incorporated U.S. Pat. No. 4,881,224 to Bains. The framer 210 contains two independent execution units. One is used to drive the payload data process (data to/from a remote destination, outside of TDM 100) while the other is used for the SOF (local to the TDM 100). The payload data is formatted in such a way that the aggregate data stream is compatible with the structure of well known aggregate signals. This payload data frame is usually referred to as the Group Frame. As described above, the SOF uses one timeslot in eighteen of the fast bit serial data bus to transfer information to/from common control module 110. This one bit in eighteen is separate and distinct from the structure used by the "manual mechanism".

The Group Frame is a 3-tier frame used to carry payload data to/from a remote node. By definition, the Group Frame must include some bandwidth for synchronization (SYNCH) and internodal communications (COMMS). As described in U.S. Pat. No. 4,881,224 to Bains, the 3-tier frame is used as a mechanism to reduce the amount of RAM required to store the description of the frame. For example, a 2.048 Mbps aggregate, described by a frame repeating at 100 Hz would require a frame length of 2,048,000/100, or 20,480 frame instructions. Using the 3-tier mechanism, however, the storage requirement is reduced to less than 4000 frame instructions (worst case), and typically much less than that.

Figure 3C:
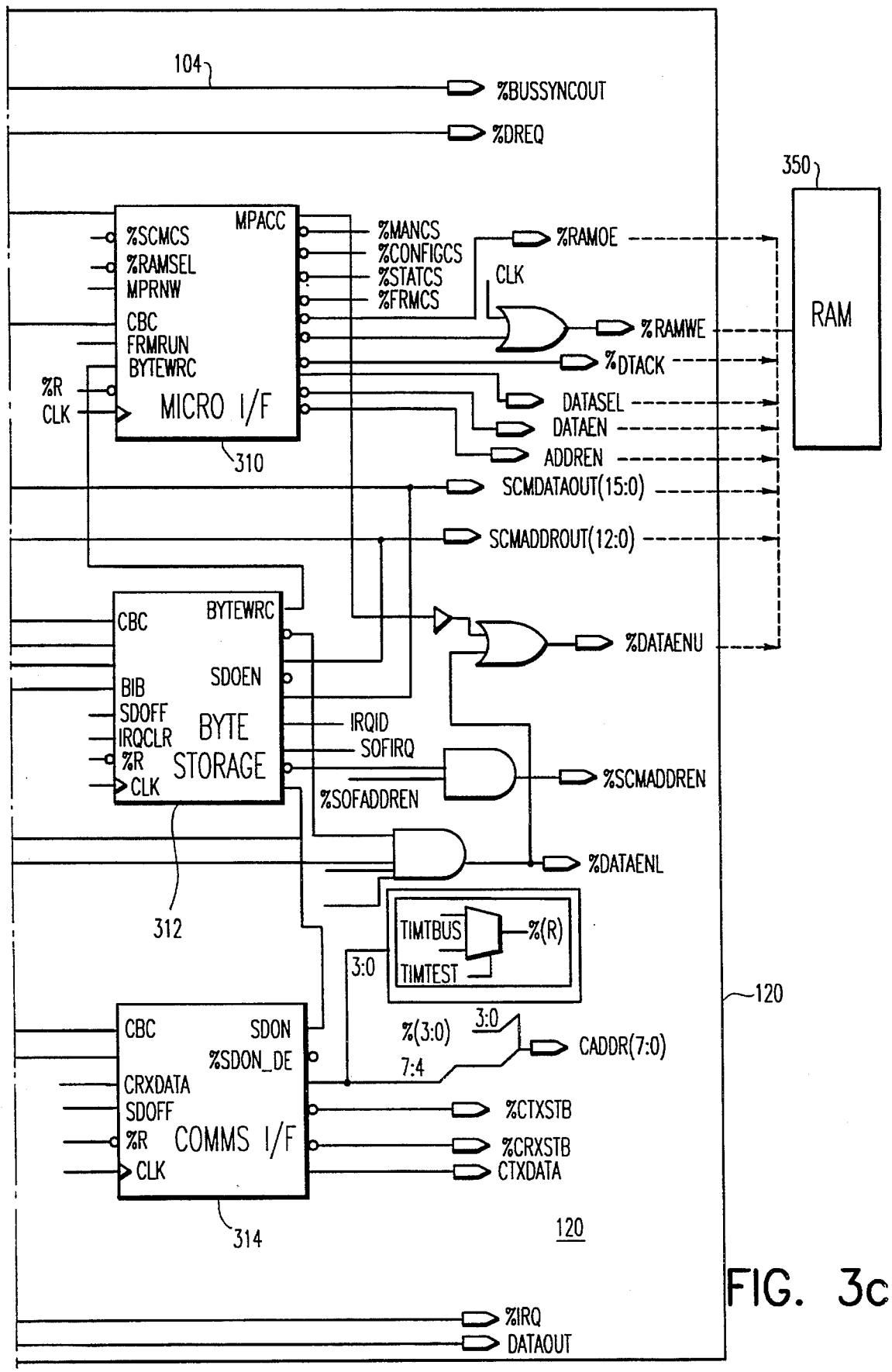
Figure 4:
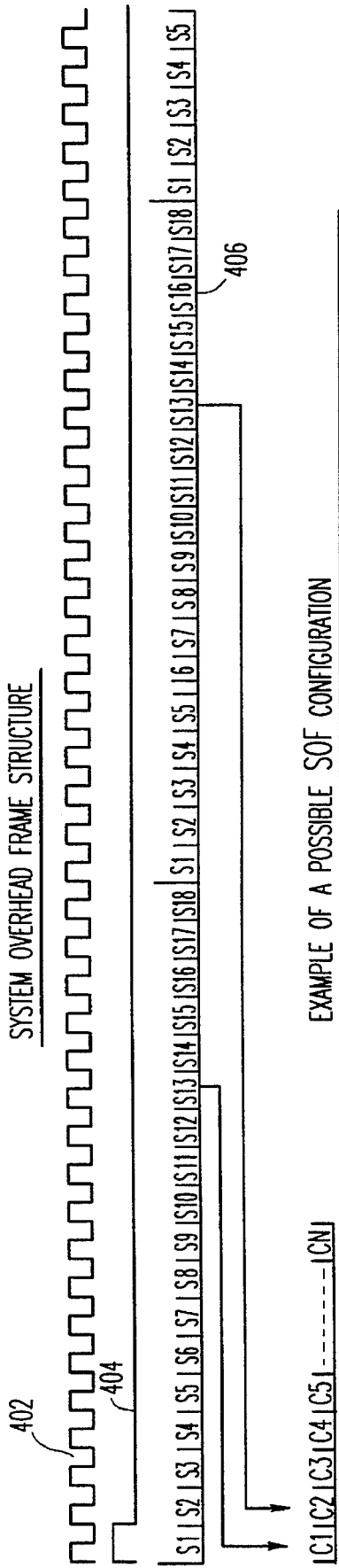
FIG. 4 is a timing diagram of a sample system overhead frame (SOF) structure for use with the present invention.

The System Overhead Frame (SOF), an example of which is shown in FIG. 4, is intended to be used for those operations which happen on a regular schedule. As will be described in detail hereinafter with reference to FIG. 3, the common control processor creates the SOF which is appropriate for its current configuration in order to automatically collect status, alarms, and to distribute slow control information. Generally, the SOF provides a convenient manner for the common module to communicate to both intelligent (e.g., modules containing a microprocessor) and non-intelligent modules on the shelf.

The status unit 212 continually collects status information from the other blocks within the DFP, and transfers the status information to the SCM 120 during the manual mechanism bandwidth and/or the system overhead bandwidth of the frame. Information needed by the processor 130 on a regular basis is transferred during each SOF frame. Additional information specifically requested by the processor 130 of the common control unit 110 is also gathered by the status unit 212 and transferred during the manual mechanism.

The scheduler 214 is used for internal scheduling of the DFP. More particularly, the DFP has various functions which utilize the busy bus 146 which is internal to the channel module. The highest priority function is transmitting data onto the fast bus 106, whether group frame data or SOF data. The second priority function is receiving data off of the fast bus 106; again whether group frame data or SOF data. The third priority function is the manual mechanism. To properly align data onto the fast bus 106, the DFP requires a substantial internal processing pipeline. Because of this pipeline, requests for use of the busy bus by the various blocks of the DFP may coincide. The scheduler 214 ensures that each block has access to the busy bus 146 and that no requests are lost.

The synch block 216 provides the mechanism necessary for achieving and maintaining synchronization between the DFP and a remote node. Five mechanisms are implemented by the synch block. A first mechanism is the generation and transmission of a synch pattern. A second mechanism is the "receive synch monitor". The receive synch monitor monitors the synch bits in the frame. The synch bits received are compared with those expected, and errors are counted. The count of the errors can be read by the common control processor to determine the number of synch errors during a period of time. A third mechanism implemented by the synch block 216 is a "receive synch search". In a receive synch search if a specified error rate is exceeded, a "frame slip" command is issued to the framer 210. This continues until a sufficiently low synch error rate warrants an "in synch" declaration. The fourth mechanism is a "frame offset calculation" where the synch block 216 computes the actual offset (# of bits) between the transmit and receive frames. The fifth mechanism is the "receive offset force". In the "receive offset force" mechanism, when one DFP in the system calculates a frame offset, software in the receive offset force mechanism loads this offset into the other DFPs to instantly force them "in synch".

The control processor 130 of the common control module 110 must have inter-nodal communication paths open to all remote nodes coupled to the TDM 100. Since it is impractical for the processor 130 to execute several Group Frames (one for each destination) and extract the associated inter-nodal communications, the COMMS unit 218 is provided within the DFP. In particular, one DFP associated with each remote destination is designated as the comms processor.

The comms unit 218 performs two primary functions. First, the comms unit 218 receives communication bits located in the Group Frame from the remote destination, and stores them temporarily in a FIFO buffer. The received communication bits are then sent to the processor 130 in the system overhead frame (SOF). Second, communication bits of the local SOF frame are received by the comms unit 218 and are stored temporarily in a FIFO. Then, those communication bits are sent to the remote destination via the Group Frame. Thus, the comms unit 218 of the DFP obtains communications information from an incoming Group Frame and inserts communications information into an outgoing Group Frame instead of the common control module, and sends and receives desired communications information to and from the common control module during the system overhead frame. This relieves the common control module from dealing with the Group Frames directly.

As shown above, the DFPs act to transfer communication information from each of the associated Group Frames into the System Overhead Frame to be processed by processor 130. The same is also true for the opposite direction.

Turning to FIG. 3, the major blocks of the system communication manager (SCM) 120 are seen. The SCM 120 generally performs two major groups of functions: those associated with the manual mechanism; and those associated with the system overhead frame for support of the various communication mechanisms. In order to perform its functions, the SCM 120 generally includes a timing generator 302, a manual mechanism 304, a serial data interface 306, a system overhead frame 308, a processor interface 310, a byte storage block 312, a communications interface block 314, and a status and configuration block 316. The SCM 120, as seen in FIG. 3 is coupled to the fast clock bus 102, the synch bus 104 and the data bus 106, and also interfaces with the common control processor 130. The common control processor utilizes various SCM communication mechanisms to configure and collect status from the other modules in the TDM 100 system and to communicate with remote TDM systems as described below.

The timing generator block 302 of the SCM functions to generate the synchronization signal which is placed on the synch bus 104. In particular, the SCM 120 receives the 9.216 MHz clock from the fast clock bus 102 and produces a 50 Hz synch clock signal therefrom by dividing down the fast clock by 184,320. The synch clock is used to identify the manual mechanism time slots on data bus 106 (by setting a counter which produces a manual mechanism indication every eighteenth time slot of the fast bus), and may also be used to identify the system overhead frame timeslots if those are regularly placed in the 9.216 MHz clock bandwidth. In addition, the synch pulse may be used to align on-bus and off-bus alignment. As aforementioned, the DFPs 118, 122, 124, . . . 126 in the system time synchronize themselves to the bus synch generated by the timing generator block of the SCM 120.

The manual mechanism 304 of the SCM is intended to be used for those operations such as testing, configuration, and detailed status reporting which do not happen with any regularity. A flexible addressing scheme allows individual cards or any group of cards in a typical TDM 100 to be accessed for those purposes.

The manual mechanism 304 offers several operating modes to the common control processor 130 for generating packets of information. In its simplest mode, a single module such as a line interface module 108 can be addressed by its physical slot number. For example, one or more registers on interface module 108 can be sequentially accessed for either read or write operations. A variation of this mode allows the same register on multiple cards, such as channel module 112, to be sequentially accessed. The next level of addressing allows any collection of cards to be accessed simultaneously. Two DFP registers located in a DFP are accessible via one of the simpler manual mechanism modes, and allow each DFP in the TDM system to be addressed as part of a sub-group or collection (as discussed above with regard to the DFP off-bus frame rates). These two configurable addresses are named the "group" and "soft" address. The "group" address refers to the collection of cards which belong to a particular aggregate and permits the common control module to talk to every card in the same group at the same time. The soft address, on the other hand, is another way of grouping cards even though they may be associated with different aggregates. For example, all of the channel module cards may be provided with the same soft address. The soft address has the specific purpose for supporting DFP frame downloads (as discussed in more detail hereinafter), but it can also be used for any general purpose grouping.

The manual mechanism is contained in MAN MECH Block 304 of the SCM 120. It is implemented as a forty bit packet containing a 24 bit header and a 16 bit data field. The generation of packets is accomplished by the common control processor 130 initializing SCM registers and setting an enable bit. For the greatest efficiency, the SCM can be configured to transfer multiple packets. Once running, the SCM will solicit microprocessor 130 every seventy-eight microseconds for data to transfer. To unburden the microprocessor from supplying the data for each packet transfer, the necessary controls have been added to the SCM to work in conjunction with a direct memory access arrangement. A special mode of operation allows an efficient downloading of the DFP frames. In this mode, the common control processor 130 can download one DFP frame to modules such as 108, 112, 114, . . . 116 in the same group simultaneously. Each DFP can customize the frame for its own use.

The preferred forty bit manual mechanism packet is broken into a twenty-four bit header and a sixteen bit data field. The forty bit manual mechanism header is preferably set up as follows:

| Manual Mechanism 24-bit Header | | |
|---|---|---|
| Field Name | Size (bits) | Definitions |
| Packet Type | 2 | 00 - Normal<br>11 - Null |
| Access Type | 3 | 000 - Individual<br>001 - Group<br>010 - Soft<br>011 - Global |
| INT/EXT | 1 | 0 - The register being addressed is external to the DFP.<br>1 - The register being addressed is internal to the DFP. |
| RW | 1 | 0 - The packet contains data to be written<br>1 - The addressed card will provide data |
| FR | 1 | 0 - Normal<br>1 - DFP Frame RAM Download/Upload |
| Access Address | 6 | Provides the address of the DFP to receive the packet. This can be the physical slot, group or soft address. |
| Register Address | 8 | Provides the address of the register to be accessed. |
| NU | 2 | Not Used |

The access type identifies how all of the DFPs in TDM 100 will be addressed as discussed above. The individual access type (000) uses the physical slot address; the group access (group address—001) identifies all cards in a compatible type group (aggregate); the soft access (soft address—010) allows cards with the same configuration to be grouped; and global access (011) allows all cards in the shelf to be accessed simultaneously.

The preferred sixteen bit manual mechanism data field is preferably set up as follows:

| Manual Mechanism 16-bit Data Field | | | |
|---|---|---|---|
| Field Name | Size (bits) | Transfer Mode | Definitions |
| Data (LSB) | 8 | Ext<br>Int<br>FR | BUSY BUS Data Byte (D7–D0)<br>DFP Lower Byte of Word<br>Frame RAM Data Byte |
| Soft Address | 6 | Ext<br>Int<br><br>FR | Not used<br>Part of the Upper Data Byte (D13–D8)<br>Soft Address used in download algorithm |
| Override | 1 | Ext<br>Int<br><br>FR | Not used<br>Part of the Upper Data Byte (D14)<br>0 - Normal download algorithm<br>1 - Write the data byte to the Frame RAM without modification. |
| Bit/Byte | 1 | Ext<br>Int | Not used<br>Part of the Upper Data |

| Manual Mechanism 16-bit Data Field | | | |
|---|---|---|---|
| Field Name | Size (bits) | Transfer Mode | Definitions |
| | | FR | Byte (D15)<br>Defines the type of Instruction<br>0 - Bit<br>1 - Byte |

The "Transfer Mode" of the manual mechanism data field is defined by the combination of the bits in the INT/EXT and FR fields of the manual mechanism header as defined above, where the FR bit is set to a value one (i.e., FR—DFP Frame RAM Download), and where "Ext" defines that the register being accessed is external to the DFP, while "Int" defines that the register being accessed is internal to the DFP.

The DFP frame RAM download algorithm is supported mostly by the DFP with the SCM providing a special download packet. The following pseudo-code is implemented by the DFP and is presented here for clarity of the mechanism.

```
if (    Packet Type = Normal
        .AND. Transfer Mode = Frame RAM
        .AND. RW = Write
        .AND. Access Type = Group
        .AND. Access Address = Group Address)
then
{
    if (Override = 0)
      then
      {
        if (Packet Soft Address = Configured Soft Address)
        then
        {
            Write Packet Data to Frame RAM
        }
        else
        {
            Change the Packet Data to a NOP instruction
                 7 6 5  4    3  2  1  0
            Bit/Byte 0 0  0    D3 D2 D1 D0
            D3–D0 = Lower nibble of Packet Data
        }
    }
    else
    {
        Write Packet Data to Frame RAM
    }
}
```

Returning to FIG. 3, the serial data interface block 306 is provided to interface the SCM with the future bus drivers of the fast data bus. Thus, buffers for storing SOF and Manual Mechanism bits are provided within the block, as well as the necessary interface and timing hardware.

The processor interface 310 of the SCM 120 is designed to operate preferably with a Motorola 68000 series microprocessor. Thus, the processor interface 310 provides the microprocessor with the ability to access all of the SCM's configuration and status registers.

The byte storage block 312 provides an interface between the SCM 120 and the processor 130 via external RAM 350 for supporting "slow controls" and "status summaries" instructions. The "slow controls" instructions effectively pass EIA RS-232 leads (RTS, CTS, Data Set Ready, etc.) to a remote device coupled to the multiplexer, while the "status summaries" include events which are used to interrupt the processor and generate an alarm, such as the number of synch errors, watchdog expirations, frame swaps, hardware failure, unconfigured/configured indications, and in-slot/out-of-slot indications. As suggested in the example below, both of these "slow controls" and "status summaries" instructions utilize a byte communication mechanism. The external RAM 350 is situated such that it may be accessed by both the byte storage block 312 and a processor 130. The slow control instructions allow locations in RAM to be read and shifted out to a DFP. These locations in RAM are shifted into the DFP and placed onto the busy bus of the channel control module as a byte. The reverse operation is performed for writing a slow control byte to the RAM. The frame index byte is used as an offset into the RAM allowing for a maximum of two hundred fifty-six slow controls to be stored. The status summary instruction unidirectional and is used for collecting status from each card in TDM 100. The status, as it is collected, is compared to a mask stored in the frame RAM (written there by software) for generating an interrupt to the processor 130. This allows important events to be acted upon immediately. The status byte is then written to a specific block of RAM and indexed by the frame index byte.

The communications block 314 provides a multiplexed serial data interface to the processor 130 of the common control module for supporting supervisory communications and "inter-module message mechanism" (IMM) instructions. The IMM instructions are basically communications between "intelligent" processors on different boards of the multiplexer 100. For example, it is possible that a line interface module might have a microprocessor controlling various aspects of its functioning, and that it is desirable for that microprocessor to be able to communicate with the SCM microprocessor. The inter-module message mechanism (IMM) is provided for that purpose. The IMM is a multi-bit instruction which when read from the Frame RAM will cause the SOF block to repeat the instruction eight times. This will reduce the amount of Frame RAM required to store a frame.

The communications block 314 places an eight bit frame index (the byte following the frame instruction in the frame RAM) onto the communications block 314 address bus (which is local to the microprocessor) to identify which serial channel is to be accessed. Therefore, this mechanism allows for the addressing of two hundred fifty-six serial communications channels. To establish a complete communication path to a remote node, one DFP within a group is selected to cross connect the SOF communications path to the group frame communications path. A "Comms" bit instruction is used for this purpose.

The status and configuration block 316 stores the present status of SCM 300.

As aforementioned, the second primary function of the common control card is to execute the system overhead frame (SOF). The SOF structure (a first example of which is shown in FIG. 4) is intended to be used for those operations which are performed on a regular schedule. The common control processor 130 creates the system overhead frame which is appropriate for its current configuration. The SOF preferably has a two-tier frame structure which supports supervisory communications, inter-module messages, slow controls, and automatic collection of status information and alarms as described above.

The SOF block 308 of FIG. 3 provides the mechanism for conducting the SOF frame. Essentially, the byte storage 312, the communications block 314, and the serial data interface block 306 have data which must be moved. The SOF block 308 is coupled to those blocks and instructs those blocks as to how and when to move the data.

In the preferred embodiment, the SOF block 308 reads an eight bit frame instruction from the RAM 350 and an eight bit index from the frame RAM 350 at a rate of 512 KHz. The eight bit overhead frame instruction identifies which communication mechanism to operate on while also providing branching information for fetching the next instruction. The eight bit overhead frame instruction is preferably contructed as follows:

| | |
|---|---|
| bit 0 | EOF indicator |
| | 0 - normal |
| | 1 - end of frame |
| bit 1 | Next instruction |
| | 0 - primary next |
| | 1 - secondary next |
| bit 2 | Transfer type |
| | 0 - off bus |
| | 1 - on bus |
| bits 7–3 | Information field |
| | 00000 bit NOP |
| | 00001 comms bit |
| | 00010 system overhead frame indicator (FIB) |
| | 00011 bit reserved for future use |
| | . |
| | . |
| | 00111 bit reserved for future use |
| | 01000 IMM bit |
| | 01001 bit reserved for future use |
| | . |
| | . |
| | 01111 bit reserved for future use |
| | 10000 byte NOP |
| | 10001 slow control byte |
| | 10010 status summary byte |
| | 10011 byte reserved for future use |
| | 10100 byte reserved for future use |
| | 10101 slow control byte - channel B of dual or quad channel |
| | 10110 byte reserved for future use |
| | 10111 byte reserved for future use |
| | 11000 byte reserved for future use |
| | 11001 slow control byte - channel C of quad channel |
| | 11010 byte reserved for future use |
| | 11011 byte reserved for future use |
| | 11100 byte reserved for future use |
| | 11101 slow control byte - channel D of quad channel |
| | 11110 byte reserved for future use |
| | 11111 byte reserved for future use |

The frame indicator bit (FIB) which is also called the "system overhead bit" allows the SCM to broadcast which of the frames it is currently running. Thus, while the manual mechanism permits a new frame to be loaded into the cards of the multiplexer of the invention "on the fly", upon changing the frame, the value of the FIB bit (stored in an SCM configuration register) will be changed when the information field of the system overhead instruction is set to "00010".

The use of the SOF is further detailed in FIG. 4. Here, the cycles of the fast clock 102 are seen, and the synch bus 404 is shown providing a synch signal at a 50 Hz rate. The system overhead frame is shown to be located in every eighteenth location (e.g., S13) of the fast clock bandwidth, with the S13 bits forming the SOF structure. As seen in FIG. 4, according to a first example of an SOF structure, the first eight bits (byte) provides a status summary byte from channel 1. The second and third bytes (bits C9–C16 and C17–C24) define status symmary bytes from channel 2 and from the line card. Bits C25, C26, C27, and C28 are used as serial communications bits (supervisory comms) to the line card, from the line card, to a redundant common card, and from a redundant common card respectively. Bits C29–C36 are then used as a control byte (slow controls) from channel 1; bits C37–44 are used as a control byte to channel 1; bits C45–52 are used as a control byte from channel 2; bits C53–60 are used as a control byte to channel 2; bits C61–68 are used as a control byte from the line card; and bits C69–76 are used as a control byte to the line card.

A second illustrative example of an SOF frame is as follows:

Channel 1
    supervisory communications @9600 bps
    slow controls (SC) @8000 bps
    status summary (SS) @1600 bps
Channel 2
    supervisory comms @9600 bps
    slow controls (SC) @8000 bps
    status summary (SS) @1600 bps
Channel 3
    IMM @8000 bps
    status summary (SS) @1600 bps Channels 1 and 2 of the example are typical of overhead for a data channel card (channel modules), while channel 3 is typical of overhead for a line interface module. Based on the second example, the composite frame would appear as follows:

| frame index | opcode | | index | next instr | end flag | frame inst | frame index |
|---|---|---|---|---|---|---|---|
| pri 0 | COMMS | ON | CH1 | sec | | 0x0e | 0x01 |
| sec 0 | COMMS | ON | CH1 | pri | | 0x0c | 0x01 |
| pri 1 | COMMS | OFF | CH1 | pri | | 0x08 | 0x01 |
| pri 2 | COMMS | ON | CH2 | pri | | 0x0c | 0x02 |
| pri 3 | COMMS | OFF | CH2 | pri | | 0x08 | 0x02 |
| pri 4 | IMM | ON | CH3 | pri | | 0x44 | 0x03 |
| *: | : : | | : | : | : | : | |
| pri 5 | IMM | OFF | CH3 | pri | | 0x40 | 0x03 |
| *: | : : | | : | : | : | : | |
| pri 6 | SC | ON | CH1 | pri | | 0x8c | 0x01 |
| *: | : : | | : | : | : | : | |
| pri 7 | SC | OFF | CH1 | pri | | 0x88 | 0x01 |
| *: | : : | | : | : | : | : | |
| pri 8 | SC | ON | CH2 | sec | | 0x8e | 0x02 |
| *: | : : | | : | : | : | : | |
| sec 1 | SS | ON | CH1 | pri | | 0x94 | 0x01 |
| *: | : : | | : | : | : | : | |
| pri 9 | SC | OFF | CH2 | pri | | 0x88 | 0x02 |
| *: | : : | | : | : | : | : | |
| pri 10 | Bit | NOP | | pri | | 0x00 | 0x00 |
| pri 11 | Bit | NOP | | pri | | 0x00 | 0x00 |
| pri 12 | Bit | NOP | | pri | eof | 0x00 | 0x00 |
| pri 0 | COMMS | ON | CH1 | sec | | 0x0e | 0x01 |
| sec 2 | COMMS | ON | CH2 | pri | | 0x0c | 0x02 |
| pri 1 | COMMS | OFF | CH1 | pri | | 0x08 | 0x01 |
| pri 2 | COMMS | ON | CH2 | pri | | 0x0c | 0x02 |
| pri 3 | COMMS | OFF | CH2 | pri | | 0xos | 0x02 |
| pri 4 | IMM | ON | CH3 | pri | | 0x44 | 0x03 |
| *: | : : | | : | : | : | : | |
| pri 5 | IMM | OFF | CH3 | pri | | 0x40 | 0x03 |
| *: | : : | | : | : | : | : | |
| pri 6 | SC | ON | CH1 | pri | | 0x8c | 0x01 |
| *: | : : | | : | : | : | : | |
| pri 7 | SC | OFF | CH1 | pri | | 0x88 | 0x01 |
| *: | : : | | : | : | : | : | |
| pri 8 | SC | ON | CH2 | sec | | 0x8e | 0x02 |
| *: | : : | | : | : | : | : | |
| sec 3 | SS | ON | CH3 | pri | | 0x94 | 0x03 |
| *: | : : | | : | : | : | : | |
| pri 9 | SC | OFF | CH2 | pri | | 0x88 | 0x02 |
| *: | : : | | : | : | : | : | |
| pri 10 | Bit | NOP | | pri | | 0x00 | 0x00 |
| pri 11 | Bit | NOP | | pri | | 0x00 | 0x00 |
| pri 12 | Bit | NOP | | pri | eof | 0x00 | 0x00 |
| pri 0 | COMMS | ON | CH1 | sec | | 0x0e | 0x01 |
| sec 4 | COMMS | OFF | CH1 | pri | | 0x08 | 0x01 |
| pri 1 | COMMS | OFF | CH1 | pri | | 0x08 | 0x01 |
| pri 2 | COMMS | ON | CH2 | pri | | 0x0c | 0x02 |
| pri 3 | COMMS | OFF | CH2 | pri | | 0x08 | 0x02 |
| pri 4 | IMM | ON | CH3 | pri | | 0x44 | 0x03 |
| *: | : : | | : | : | : | : | |
| pri 5 | IMM | OFF | CH3 | pri | | 0x40 | 0x03 |
| *: | : : | | : | : | : | : | |
| pri 6 | SC | ON | CH1 | pri | | 0x8c | 0x01 |
| *: | : : | | : | : | : | : | |
| pri 7 | SC | OFF | CH1 | pri | | 0x88 | 0x01 |
| *: | : : | | : | : | : | : | |
| pri 8 | SC | ON | CH2 | sec | | 0x8e | 0x02 |
| *: | : : | | : | : | : | : | |
| sec 5 | SS | ON | CH2 | pri | | 0x94 | 0x02 |
| *: | : : | | : | : | : | : | |
| pri 9 | SC | OFF | CH2 | pri | | 0x88 | 0x02 |
| *: | : : | | : | : | : | : | |
| pri 10 | Bit | NOP | | pri | | 0x00 | 0x00 |
| pri 11 | Bit | NOP | | pri | | 0x00 | 0x00 |
| pri 12 | Bit | NOP | | pri | eof | 0x00 | 0x00 |
| pri 0 | COMMS | ON | CH1 | sec | | 0x0e | 0x01 |
| sec 6 | COMMS | OFF | CH2 | pri | | 0x08 | 0x02 |
| pri 1 | COMMS | OFF | CH1 | pri | | 0x08 | 0x01 |
| pri 2 | COMMS | ON | CH2 | pri | | 0x0c | 0x02 |
| pri 3 | COMMS | OFF | CH2 | pri | | 0x08 | 0x02 |
| pri 4 | IMM | ON | CH3 | pri | | 0x44 | 0x03 |
| *: | : : | | : | : | : | : | |
| pri 5 | IMM | OFF | CH3 | pri | | 0x40 | 0x03 |
| *: | : : | | : | : | : | : | |
| pri 6 | SC | ON | CH1 | pri | | | 0x01 |
| *: | : : | | : | : | : | : | |
| pri 7 | SC | OFF | CH1 | pri | | 0x88 | 0x01 |
| *: | : : | | : | : | : | : | |
| pri 8 | SC | ON | CH2 | sec | | 0x8e | 0x02 |
| *: | : : | | : | : | : | : | |
| sec 7 | Byte | NOP | | pri | | 0x00 | 0x00 |
| *: | : : | | : | : | : | : | |
| pri 9 | SC | OFF | CH2 | pri | | 0x88 | 0x02 |
| *: | : : | | : | : | : | : | |
| pri 10 | Bit | NOP | | pri | | 0x00 | 0x00 |
| pri 11 | Bit | NOP | | pri | | 0x00 | 0x00 |
| pri 12 | Bit | NOP | | pri | eof | 0x00 | 0x00 |
| pri 0 | COMMS | ON | CH1 | sec | | 0x0e | 0x01 |
| sec 8 | FIB | ON | | pri | | 0x14 | 0x00 |
| pri 1 | COMMS | OFF | CH1 | pri | | 0x08 | 0x01 |
| pri 2 | COMMS | ON | CH2 | pri | | 0x0c | 0x02 |
| pri 3 | COMMS | OFF | CH2 | pri | | 0x08 | 0x02 |
| pri 4 | IMM | ON | CH3 | pri | | 0x44 | 0x03 |
| *: | : : | | : | : | : | : | |
| pri 5 | IMM | OFF | CH3 | pri | | 0x40 | 0x03 |
| *: | : : | | : | : | : | : | |
| pri 6 | SC | ON | CH1 | pri | | 0x8c | 0x01 |
| *: | : : | | : | : | : | : | |
| pri 7 | SC | OFF | CH1 | pri | | 0x88 | 0x01 |
| *: | : : | | : | : | : | : | |
| pri 8 | SC | ON | CH2 | sec | | 0x8e | 0x02 |
| *: | : : | | : | : | : | : | |
| sec 9 | Byte | NOP | | pri | eof | 0x00 | 0x00 |
| *: | : : | | : | : | : | : | |
| pri 9 | SC | OFF | CH2 | pri | | 0x88 | 0x02 |
| *: | : : | | : | : | : | : | |
| pri 10 | Bit | NOP | | pri | | 0x00 | 0x00 |
| pri 11 | Bit | NOP | | pri | | 0x00 | 0x00 |
| pri 12 | Bit | NOP | | pri | eof | 0x00 | 0x00 |

In the composite frame above, a "*" indicates that an instruction is repeated eight times. Also, it will be appreciated that the frame instruction and frame index are indicated in hexadecimal code (Ox), while the end flag is bit 0 of the system overhead frame instruction and the next instruction is bit 1 of the SOF instruction.

The same illustrative composite frame set forth above is shown below, after being broken down into its two tier components. This is how the frame is preferably stored in the frame RAM 350:

| | | Primary frame | | | | |
|---|---|---|---|---|---|---|
| frame index | opcode | | index | next instr | end flag | frame inst | frame index |

| frame index | opcode | | index | next instr | end flag | frame inst | frame index |
|---|---|---|---|---|---|---|---|
| pri0 | COMMS | ON | CH1 | sec | | 0x0e | 0x01 |
| pri1 | COMMS | OFF | CH1 | pri | | 0x08 | 0x01 |
| pri2 | COMMS | ON | CH2 | pri | | 0x0c | 0x02 |
| pri3 | COMMS | OFF | CH2 | pri | | 0x08 | 0x02 |
| pri4 | IMM | ON | CH3 | pri | | 0x44 | 0x03 |
| pri5 | IMM | OFF | CH3 | pri | | 0x40 | 0x03 |
| pri0 | SC | ON | CH1 | pri | | 0x8c | 0x01 |
| pri7 | SC | OFF | CH1 | pri | | 0x88 | 0x01 |
| pri8 | SC | ON | CH2 | sec | | 0x8e | 0x02 |
| pri9 | SC | OFF | CH2 | pri | | 0x88 | 0x02 |
| pri10 | Bit | NOP | | pri | | 0x00 | 0x00 |
| pri11 | Bit | NOP | | pri | | 0x00 | 0x00 |
| pri12 | Bit | NOP | | pri | eof | 0x00 | 0x00 |

| | | Secondary frame | | | | |
|---|---|---|---|---|---|---|
| frame index | opcode | | index | next frm | end flag | frame inst | frame index |

| frame index | opcode | | index | next frm | end flag | frame inst | frame index |
|---|---|---|---|---|---|---|---|
| sec 0 | COMMS | ON | CH1 | pri | | 0x0c | 0x01 |
| sec 1 | SS | ON | CH1 | pri | | 0x94 | 0x01 |
| sec 2 | COMMS | ON | CH2 | pri | | 0x0c | 0x02 |
| sec 3 | SS | ON | CH3 | pri | | 0x94 | 0x03 |
| sec 4 | COMMS | OFF | CH1 | pri | | 0x08 | 0x01 |
| sec 5 | SS | ON | CH2 | pri | | 0x94 | 0x02 |
| sec 6 | COMMS | OFF | CH2 | pri | | 0x08 | 0x02 |
| sec 7 | Byte | NOP | | pri | | 0x00 | 0x00 |
| sec 8 | FIB | ON | | pri | | 0x14 | 0x00 |
| sec 9 | Byte | NOP | | pri | eof | 0x00 | 0x00 |

Additional information regarding the preferred system communication manager 120 of the invention may be seen with reference to Appendix A hereof.

There has been described and illustrated herein a time division multiplexer utilizing distributed frame processing. While particular embodiments of the invention have been described, it is not intended that the invention be limited thereto, as it is intended that the invention be as broad in scope as the art will allow and that the specification be read likewise. Thus, while particular circuitry has been shown, it will be appreciated that the SCM and DFPs can take other forms. Also, while the system overhead frame has been described as being multiplexed along with the manual mechanism and the data, it will be appreciated that the system overhead can be transferred in a different manner such as by providing a separate serial or parallel bus for the same. Conversely, it will be appreciated that additional information such as the synchronization information can be provided directly on the high speed bus rather than providing a separate synchronization bus. Thus could be done by encoding the low speed synch signal onto the high speed bus. Further, while particular examples have been utilized to illustrate the invention, it will be appreciated that the invention is not limited thereto. Indeed, different numbers of channels, common cards, aggregates, etc. can be used in a given system, with different bit rates, etc. In fact, it should be noted that while certain bandwidths were specificied as preferred, it will be appreciated that the fast clock could have a different frequency, and the manual mechanism and SOF could utilize different amounts of the available bandwidth. It will therefore be appreciated by those skilled in the art that yet other modifications could be made to the provided invention without deviating from its spirit and scope as so claimed.

SCM Address MAP

| Register Base Address | Description | uP Access | Width | Bits |
|---|---|---|---|---|
| /MEMCS | | | | |
| 0000H – 3FFFH | SCM RAM | r/w | 8 | D7-D0 |
| | | | | |
| /REGCS | | | | |
| 00H | SOF PRI Running | r/w | 11 | D11-D1 |
| 02H | SOF PRI Restart A | r/w | 11 | D11-D1 |
| 04H | SOF PRI Restart B | r/w | 11 | D11-D1 |
| 06H | SOF SEC Running | r/w | 11 | D11-D1 |
| 08H | SOF SEC Restart A | r/w | 11 | D11-D1 |
| 0AH | SOF SEC Restart B | r/w | 11 | D11-D1 |
| 0CH | * SOF Grp Parms | r/w | 4 | D6,D5,D1,D0 |
| 0EH | Frame Control Register | r/w | 2 | D1,D0 |
| | | | | |
| 10H | Test Register | r/w | 2 | D1,D0 |
| | | | | |
| 20H | Manual Control Register | r/w | 1 | D0 |
| 22H | Manual Mode Register | r/w | 12 | D11-D0 |
| 24H | Manual Address Register | r/w | 14 | D15-D8,D5-D0 |
| 26H | Manual Message Length Reg | r/w | 13 | D12-D0 |
| 28H | Manual Data Register | r/w | 16 | D15-D0 |
| | | | | |
| 30H | ** IRQID Status Register | r/o | 10 | D9-D0 |
| 32H | *** Manual Status Register | r/o | 2 | D1,D0 |
| 34H | SCM Revision Level | r/o | 8 | D7-D0 |

NOTES:

- All r/w registers are initialized to 0's unless otherwise specified.

· All SCM uP accesses must be word accesses.

\* r/w only upon initialization.
r/o after SOF RUN is set.

\*\* SCM IRQ clears upon reading this register.

\*\*\* Read Overflow bit is cleared upon reading this register.

Appendix A
page 1

The manual system overhead mechanism allows the common module to communicate to the other modules in the system. Communication is accomplished by utilizing 1 bit in 18 on the serial bus to transfer 40 bit packets. These packets have a 24 bit header and 16 bit data field.

The manual mechanism requires an external DMA device for supplying the data to be transimtted for write operations or to extract and save data being received during read operations.

The following steps are required by S/W to initiate the generation of manual packets for either reads or writes:

1. External DMA Set-Up

1. Memory word to I/O word transfer.

2. I/O pointer equals SCM's Manual Data Register.

3. Define the number of bytes (2X number of words spec in Message length register) to transfer.

4. Set transfer mode to - External Cycle Steal.

5. Transfer is complete when - words to transfer equal zero.

6. Generate an interrupt upon completion.

2. SCM Set-Up

1. Configure Manual Mode Register.

2. Configure Manual Address Register.

3. Configure Message Length Register (number of words to be transferred).

3. Start Transfer

1. Set DMA's Enable Bit (Must be set first).

2. Set SCM's Manual Enable Bit (Must be set second).

4. End Transfer

1. Use DMA's interrupt to indicate end-of-transfer.

Appendix A
page 2

Write Operation Description

After the SCM's enable bit is set, the SCM will assert DREQ but will continue sending Null packets until it receives its first word of data from the DMA. It is expected that the DMA will be able to respond to subsequent DREQs with a max delay of 78us. This will ensure that each packet sent will contain valid data. If the DMA does not respond in time, the SCM will generate a Null packet (in this case, DREQ will not be asserted) and the message length counter will not be decremented. The message length counter is decremented upon sending each valid write packet until it reaches a count of zero. Upon the count of zero, the SCM will clear its DMA enable bit and send Null packets.

Read Operation Description

After the SCM's enable bit is set, the SCM will not assert DREQ until it has received a valid word of data. Upon receiving a word, it is loaded into the manual data register, DREQ is asserted and the message length counter is decremented. It is expected that the DMA will be able to respond to subsequent DREQs with a max delay of 78us. If the DMA does not respond in time, the SCM will generate a Null packet (in this case, DREQ will not be asserted again ) and the message length counter will not be decremented. When the message length counter equals zero, the SCM will clear its Manual Enable bit in the "Manual Control Register" and send Null packets.

Appendix A
page 3

```
Manual Control Register
   Base Address = 20H
        +---+
        | 0 |
        +---+
          |
          |
Manual Enable --+
```

Manual Enable

0 - Disabled
    1 - Enabled

- S/W sets this bit to initiate manual packet generation.
- When this bit is clear, Null packets are sent.
- Upon the message length register reaching a count of zero, this bit will be forced clear by H/W.

Appendix A
page 4

```
               Manual Mode Register
                Base Address = 22H
  +---+---+---+---+---+---+---+---+---+---+---+---+
  |11 |10 | 9 | 8 | 7 | 6 | 5 | 4 | 3 | 2 | 1 | 0 |
  +---+---+---+---+---+---+---+---+---+---+---+---+
    |   |   |   |   |   |   |   |   |   |   |   |
    |   |   +-+-+   +---+---+   +-+-+   +-+-+   |
   FU1  |     |         |         |       |    R/W
       FU2    |         |         |       |
   Packet Type --+      |         |       |
            Access Type --+       |       |
                     Transfer Mode --+    |
                               Inc Mode ---+
```

FU1 & FU2
    00 - Set to zero for future compatability.

Packet Type
    00 - Normal
    01 - N/U    - Will be decoded by HW as null packet
    10 - N/U    - Will be decoded by HW as null packet
    11 - Null   - Set by Hardware Access Type
    000 - Individual
    001 - Group
    010 - Soft
    011 - Global
    100 - N/U    - Will be decoded by HW as null packet
    101 - N/U    - Will be decoded by HW as null packet
    110 - N/U    - Will be decoded by HW as null packet
    111 - N/U    - Will be decoded by HW as null packet Transfer Mode
    00 - Access to a register external to the DFP
    01 - Access to a register internal to the DFP
    10 - Access to the Frame RAM
    11 - N/U Inc Mode
    00 - Incr disabled
    01 - Incr Access Address by 1   (Slot/Group/Soft number)
    10 - Incr Register Address by 1 (Internal/External Address)
        External DFP Address means an address external to the
        DFP such as the CIAO or other registers on a module.
    11 - N/U - HW will decode as 'Incr disabled'

R/W
    0 - Generate packets for Write operations
    1 - Generate packets for Read operations 4.3.5.2.3 Manual Address Register -

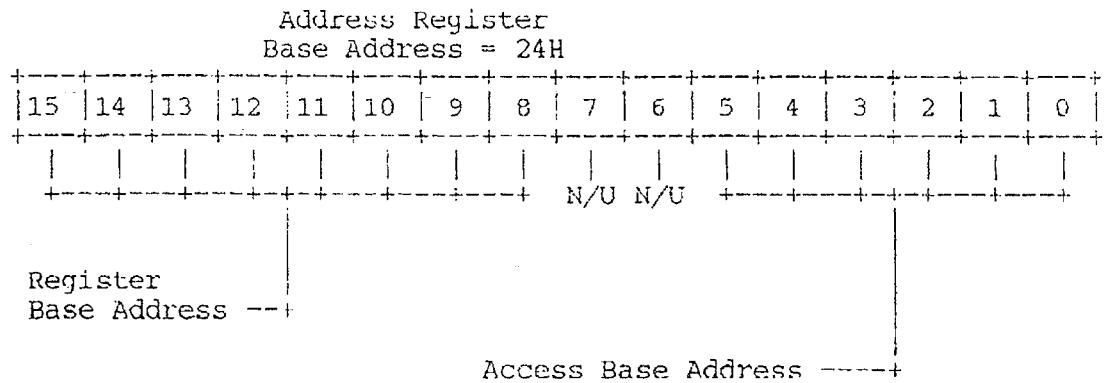

N/U
---

Not Used bits should be set to zero.

Access Base Address
-------------------

This address will be incremented after each DMA access to
   the Manual Data register if the "Mode Register" bits for
   Inc Mode are "01".

Register Base Address
---------------------

The address of an internal or external DFP register.

This address will be incremented after each DMA access to
   the Manual Data register if the "Mode Register" bits for
   Inc Mode are "10".

Appendix A 4.3.5.2.4 Manual Message Length Reg -

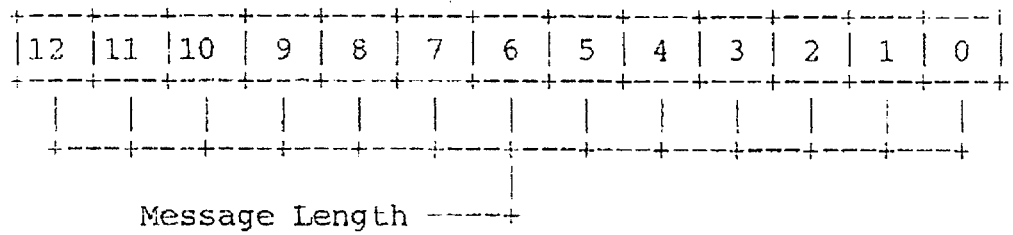

Message Length Register
Base Address = 26H

```
+---+---+---+---+---+---+---+---+---+---+---+---+---+
|12 |11 |10 | 9 | 8 | 7 | 6 | 5 | 4 | 3 | 2 | 1 | 0 |
+---+---+---+---+---+---+---+---+---+---+---+---+---+
|   |   |   |   |   |   |   |   |   |   |   |   |   |
+---+---+---+---+---+---+---+---+---+---+---+---+---+
              Message Length ----+
```

Message Length - Number of words to be transferred.

Range -
        For Frame RAM                01 -  000H (8K)
        For Register/Opcode Inc Mode  01 -  100H (256)
        For Access Inc Mode          01 -   40H (64)

Note: For 8,192 transfers, set the message length to 0000H. This is because the register is 13 bits long and therefore will start its countdown from zero. Transfers will then continue until the register reaches zero.

Appendix A
page 7

4.3.5.2.5 Manual Data Register -

Manual Data Register
Base Address = 28H

```
    Data Register usage for Internal Transfers
+--+--+--+--+--+--+--+--+--+--+--+--+--+--+--+--+
|15|14|13|12|11|10| 9| 8| 7| 6| 5| 4| 3| 2| 1| 0|
+--+--+--+--+--+--+--+--+--+--+--+--+--+--+--+--+
|                                               |
+------------------ Data ----------------------+
              N/A                Data
            set to zero Data Register usage for Frame RAM Transfers
+--+--+--+--+--+--+--+--+--+--+--+--+--+--+--+--+
|15|14|13|12|11|10| 9| 8| 7| 6| 5| 4| 3| 2| 1| 0|
++-++-+--+--+--+--+--+--+--+--+--+--+--+--+--+--+
 |  |  |                |                       |
 |  |  +- Soft Address -+------ Data -----------+
 |  |
 |  +-- Byte/Bit
 |
 +-- Override
```

Byte/Bit    NOTE: N/A when Override set
--------

0 - Bit Instruction
  1 - Byte Instruction 4.3.5.2.6 Manual Status Register -

Manual Status Register
Base Address = 32H

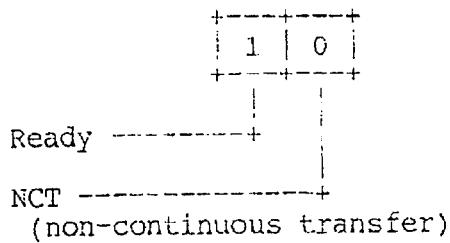

Ready ---------+
NCT --------------+
(non-continuous transfer)

Ready
-----
   if READ
   -------
      0 - Manual Data Register is Empty.
      1 - Manual Data Register is Full.

if WRITE
   --------
      0 - Manual Data Register is Full.
      1 - Manual Data Register is Empty.

NCT
---
   Set by hardware when a NULL Packet is transferred
      during a read or write operation due to the Manual
      Data Register not being accessed (read/written)
      before the next packet is ready for transfer.
      It is cleared upon being read by software.

Note:

This register applicable when the manual interface
is used in a polling application. Currently, however
the 68302 IDMA and its interrupt are used to indicate
packet transmission completion.

Appendix A
page 9

20. A time division multiplexer according to claim 19, wherein:

said at least two data frames for putting data onto said high speed bus and taking data off of said high speed bus are tiered data frames.

We claim:

1. A time division multiplexer for multiplexing data from a plurality of channels, comprising:

a) a high speed bus having a first data rate;

b) a means for synchronizing;

c) a system communication manager means coupled to said high speed bus, and including intelligent processing means for generating a data frame;

d) a plurality of processors, each having a memory which stores said data frame, each one of said processors being coupled between a respective one of said channels and said high speed bus, and each of said processors being synchronized by said means for synchronizing, wherein said system communication manager means for transmitting said data frame to said plurality of processors over said high speed bus at predetermined times and at an effective second data rate slower than said first data rate, whereupon each of said processors stores said data frame in its memory, and said system communication manager means for causing said means for synchronizing to generate a synch signal which synchronizes said processors, wherein, said data frame comprises a first sequence of instructions for said plurality of processors coupled to said channels, which instructions instruct said processors as to when to place data on said high speed bus, and each of said plurality of processors synchronously and simultaneously runs said data frame and places data on said high speed bus according to said instructions of said data frame when the channel with which a particular processor is associated is indicated by said data frame.

2. A time division multiplexer according to claim 1, wherein:

said means for synchronizing comprises a synch bus coupled to said plurality of processors and to said system communication manager means.

3. A time division multiplexer according to claim 1, wherein:

said memory of each of said processors stores at least two data frames, wherein each of said processors takes data off of said high speed bus according to a second of said at least two data frames.

4. A time division multiplexer according to claim 3, wherein:

said at least two data frames are tiered data frames.

5. A time division multiplexer according to claim 4, wherein:

said means for synchronizing comprises a synch bus coupled to said plurality of processors and to said system communication manager means.

6. A time division multiplexer according to claim 1, wherein:

said high speed bus is a bidirectional bus.

7. A time division multiplexer according to claim 1, wherein:

said high speed bus has a first bandwidth based on said first rate, and said first bandwidth is divided into a second bandwidth for channel data, and a third bandwidth based on said effective second rate for framing information generated by said system communication manager means.

8. A time division multiplexer according to claim 7, wherein:

said high speed bus is a bidirectional bus, and said second bandwidth is divided in half between data going in a first direction and data going in a second direction.

9. A time division multiplexer according to claim 8, wherein:

at least one of said plurality of channels comprises an aggregate channel, and said time division multiplexer multiplexes data from the others of said plurality of channels onto said aggregate channel in said first direction, and demultiplexes data from said aggregate channel to others of said plurality of channels in said second direction.

10. A time division multiplexer according to claim 7, wherein:

said third bandwidth contains bits of data, wherein a predetermined number of said bits of data of said third bandwidth comprise a group having a header and a data field.

11. A time division multiplexer according to claim 10, wherein:

said header includes an address of a register to be accessed.

12. A time division multiplexer according to claim 11, wherein:

said header further includes an address of a register to receive bits of said data field.

13. A time division multiplexer according to claim 7, wherein:

said first bandwidth is further divided into a fourth bandwidth for system overhead information governed according to a system overhead frame.

14. A time division multiplexer according to claim 13, wherein:

at least one of said plurality of processors is located on a channel module card means which also includes a channel interface means for interfacing with one of said plurality of channels, said channel module card means includes status means for monitoring the status of said channel module card means, and said system overhead information comprises status information bits provided by said status means which relate to the status of said channel module card means.

15. A time division multiplexer according to claim 14, wherein:

said system overhead information further comprises bits which pass EIA RS232 control signals.

16. A time division multiplexer according to claim 14, wherein:

at least one of said plurality of processors comprises an intelligent processor, and said system overhead information further comprises bits used for communicating between said intelligent processing means of said system communication manager means and said intelligent processor.

17. A time division multiplexer according to claim 13, wherein:

said first bandwidth is 9.216 MHz, said second bandwidth is 8.192 MHz, said third bandwidth is 512 KHz, and said fourth bandwidth is 512 KHz.

18. A time division multiplexer according to claim 17, wherein:

said means for synchronizing comprises a synch bus coupled to said plurality of processors and to said system communication manager means.

19. A time division multiplexer according to claim 18, wherein:

said memory of each of said processors stores at least two data frames, wherein each of said processors takes data off of said high speed bus according to a second of said at least two data frames.

20. A time division multiplexer according to claim 19, wherein:

said at least two data frames are tiered data frames.

* * * * *